A. R. BANGS.
WHEEL TIRE.
APPLICATION FILED JULY 29, 1908.
923,104.
Patented May 25, 1909.
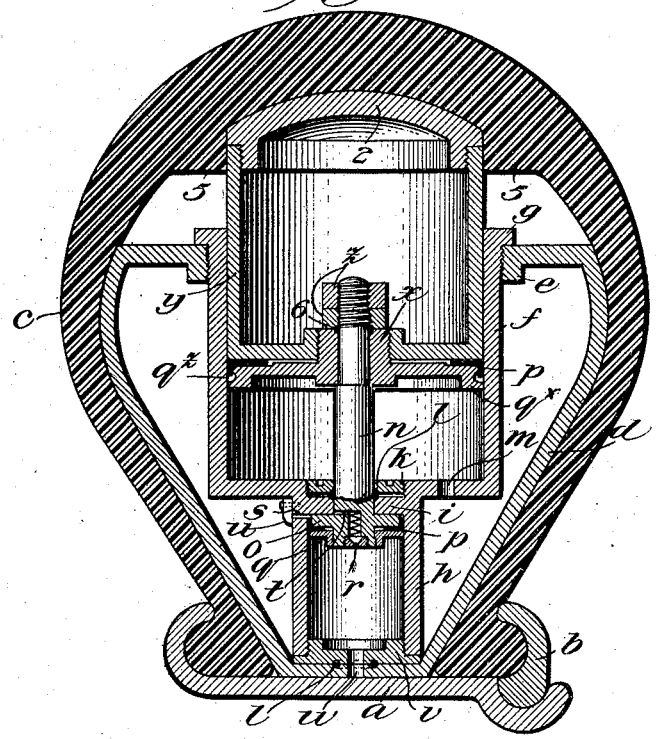
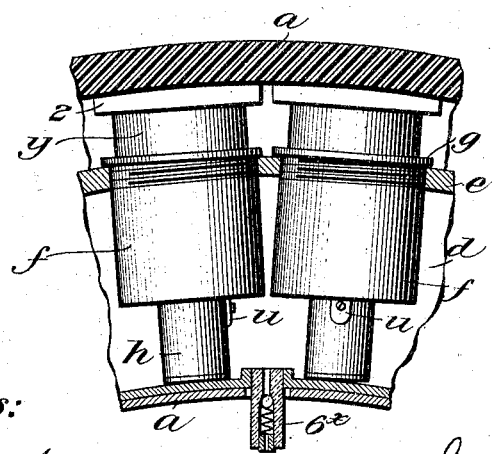
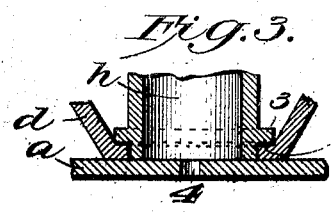
Witnesses:
W. H. Ourand
Alex. Scott
Inventor:
Anson R. Bangs
By R. W. Barkley
his atty.

UNITED STATES PATENT OFFICE.

ANSON R. BANGS, OF NEW YORK, N. Y.

WHEEL-TIRE.

No. 923,104.      Specification of Letters Patent.      Patented May 25, 1909.

Application filed July 29, 1908. Serial No. 445,955.

*To all whom it may concern:*

Be it known that I, ANSON R. BANGS, a citizen of the United States, and a resident of New York city, in the county of New York and State of New York, have invented a certain new and useful Improvement in Wheel-Tires, of which the following is a specification.

This invention relates to tires for self-propelled and other vehicles, and has for objects the securing of adhesion to the roadway and resilience of the tire and also property or quality of non-puncturability.

Another object is to secure a relatively long life to an inflated tire.

Another object is to inject air under pressure in order to maintain the air-pressure in the tire.

Other objects will appear hereinafter.

The invention consists of features of construction, arrangements and combinations of devices hereinafter described and more particularly pointed out in the appended claims.

The invention is embodied in the tire illustrated in the accompanying drawing, forming part hereof, in which—

Figure 1 is a cross-sectional view; Fig. 2 is a fragmentary view on the central plane of the tire, showing side elevations of two cups or cylinders, etc.; and Fig. 3 is a modification showing the pump-cylinder positively connected to the air-reservoir.

In the drawing, the reference character $a$ marks a rim, of a known form or type, and $b$ marks the locking ring used with such rim, while $c$ designates a rubber shoe, also of known form or type.

The reference $d$ designates a metal tube placed within the shoe $c$, said tube being somewhat pear-shaped in transverse section, and thickened or stiffened at $e$ to provide for the screw threads whereby the cylindrical cups $f$ are attached to said tube $d$, said cups $f$ being provided with external flanges $g$ which seat on the outer surface of the tube $d$, as shown. Concentric with the cups $f$ are other cups or cylinders $h$, said cups $f$ and $h$ being integrally united together and separated by the walls $i$ also integral with the metal of the cups, in the preferred form. The walls or separating ends $i$ are located a short distance down the cylinders $h$ from the cylinders or cups $f$, and are provided with perforations or bearings for the piston rods $n$. Packings $l$ are secured about the piston rods $n$ by the nuts $k$, which screw down toward the walls $i$ aforesaid, whereby air tight septums between the cups or cylinders $h$ and $f$ are secured. The upper ends of the rods $n$ are shouldered and screw threaded, to connect them to the pistons or plungers $y$ by means of the clamps $q^x$ and nuts $z$. The clamps $q^x$ have externally threaded tubular bosses $x$, which screw into the ends of the plungers, $y$, as shown, and the nuts $z$ draw the rods $n$ firmly up against the undersides of the clamps $q^x$. Packings 6 may be used between the nuts $z$ and the bosses $x$ to secure airtight joints. Between the clamps $q^x$ and the plunger heads or ends are cupped leather packings $p$, said packings being firmly held by the clamps and the ends aforesaid; the clamps are recessed at $q^z$ to allow access of air behind the packings as shown.

Preferably of one piece with the piston rods $n$ are the piston-heads $o$, in the cylinders $h$. Cupped leather packings $p$, held in place by the clamping nuts $q$, prevent leakage of air as the pistons move toward the walls $i$ aforesaid. The piston-rods $n$ are provided with passageways or ports $t$ in order to connect the spaces at opposite sides of the pistons $o$, and such ports $t$ are provided with spring check-valves $r$ for allowing air to pass into the cylinders $h$ between said pistons $o$ and the walls $i$ aforesaid whenever the pistons may be moved toward the center of the wheel. The cylinders $h$ are provided with ports $s$ which, in the instance illustrated, connect the interior of said cylinders $h$ with the space of the tube $d$, suitable check-valves $u$ being provided for the purpose of preventing air from passing back into the said cylinders, and the ports $s$ being located at the upper ends of the cylinders $h$ so as to discharge the air compressed by the pistons $o$ when these are forced outwardly of the wheel. The walls $i$ and piston heads $o$ also act as stops to limit the outward motion of the plungers $y$ under the action of the air confined in the cups $f$. Small vents $m$ in the bottoms of the cups $f$ allow the exit and entry of air from and into the cylinders or cups $f$ as the pistons or plungers $y$ move toward and from the bottoms of said cups $f$. The air in the cylinders $f$ is compressed more or less when the plungers $y$ are driven in, the amount of compression depending upon the areas of the orifices $m$ as well as upon the extent of the inward motion of the plungers. Where the plungers $y$ are hollow, as in the instance illustrated in the drawing, their upper ends are closed by the heads 2, which screw thereinto, and which heads are rectangular in plan and have their outer surfaces shaped to conform to the inner surface of the shoe c. The rubber shoe c may be provided on the inside thereof with the circumferentially extending ribs or flanges 5 at each side of the heads 2 for the purpose of holding the latter with the longer axes in the plane of the wheel.

The inner ends of the cylinders h may be closed by the caps v, which screw thereinto, as in Fig. 1; or such cylinders h may be provided with external flanges 3 and with threaded ends and screw into threaded holes in the inner face or wall of the tube d, as shown in Fig. 3. Packing rings or gromets l may be used to insure air tight joints at the ends of the cylinders h. The cylinders h are in communication with the air by means of the holes w through the caps v and the tube d, and in case there is not enough seepage of air into the small spaces inside the shoe c, the rim a may have perforations 4 therein to put said cylinders h in communication with the air.

In use, the tube d and cylinders f are filled with air under a suitable pressure, and the plungers y are normally in their outer positions (those shown in Figs. 1 and 2) and the shoe c is as fully distended as in case the soft rubber inner tube were used, the outward motion of the plungers being limited by the piston heads o and the stop-walls i, as will be understood. The cylinders h have air at the atmospheric pressure therein, when they are in the position shown in Fig. 1. Whenever the plungers y are driven in to any extent, the check valve at r opens and allows the air to pass above the piston o, or into the space between said piston and the wall i; when the plunger is forced outward again, by the air-pressure acting on the end of the plunger y, the air trapped above the piston o is forced out through the perforation s into the tube d. Excessive pressure in the tube d may be avoided by using any suitable form of relief valve, such as that shown at $6^x$.

It is noted that, with respect to certain features of the invention, the head or stop o acts merely to limit the outward motion of the plungers, in which case the cylinder h could be omitted without departing from the invention in respect of said features; also, that the cylinders h act to brace the cylinders f against the inner wall of the tube d, whereby the effect of blows on the outer face of the tube d and of the plungers against the bottom of the cylinders f is transmitted to the rim a; by arranging the clamps $q^x$ so that they strike the bottoms of the cylinders f (assuming them to be driven that far) directly opposite the walls of the cylinders h, there is no tendency to distort the cylinders f. The differential areas of the cylinders f and h and of the pistons y and o make the cylinders h and their pistons act in the nature of dashpots to the outward motion of the plungers y, and "slamming" may be prevented by making the openings s sufficiently small. That is, the plunger-piston y has a greater effective area than has the piston o, thus making the two differential pistons with respect to each other. The effects of centrifugal force may be minimized by making the plungers, piston rods, and other moving parts hollow and recessed wherever possible without sacrifice of strength. Should the cylinders h be omitted, as in utilizing the rods n and heads o merely as stops for the plungers, the holes m may also be omitted, provided there is sufficient clearance around the rods n where these pass through the ends of the cups f.

The heads of the plungers y form a sectional tread for the wheel the various members of which may move in and out independently one of another, and any suitable form of casing, shoe or tire-cover may be employed to give better adhesion to roadways and to exclude dirt and dust from the working parts; the shoe c shown in the drawing is one such cover or casing.

The invention is not limited to the precise form thereof shown in the drawing and above described, but may be embodied otherwise without departing from the spirit and the scope of the claims.

What I claim as new and desire to secure by Letters Patent of the United States is—

1. In a wheel-tire, the combination with a tube, a series of cylinders within and secured to said tube, said cylinders being open at their outer ends and also having ports connecting them with the space in said tube, smaller cylinders connected tandem to said open-end cylinders, said tandem cylinders forming struts in said tube and said smaller cylinders being provided with valved passageways whereby they discharge air from themselves against air-pressure in said tube and larger cylinders, and differential pistons in said cylinders, of a tire-cover or casing.

2. In a wheel-tire, the combination with a metal tube, a series of cylinders within and secured to said tube, said cylinders being open at their outer ends, smaller cylinders integral with said open-end cylinders and placed tandem with respect thereto and said tandem cylinders forming struts in said tube, plungers in said open-end cylinders, pistons in said smaller cylinders, rods connecting said plungers and said pistons, means whereby said plungers force air into and draw it from said tube, and means whereby said pistons force air out of said smaller cylinders against air-pressure in said tube and said open-end cylinders during outstrokes of said plungers, of a tire-cover or casing.

3. In a wheel-tire, the combination of an air-reservoir, a cylinder connected by a passageway with said reservoir, a plunger in said cylinder, a dashpot, means whereby said dashpot discharges air against air-pressure in said reservoir and said cylinder, and a tire-cover or casing.

4. In a wheel-tire, the combination with a metal tube, an outwardly-opening cylindrical cup within and connected at its mouth to said tube, a plunger in said cup, said cup being provided with a hole whereby said plunger forces air into and draws it from said tube, a rod connected to said plunger and passing through the bottom of said cup, and a stop on said rod coacting with the bottom of the cup for limiting the outward motion of said plunger, of a cover or casing.

5. In a wheel-tire, the combination with a metal tube, a cup set in the outer face of said tube, a plunger in said cup, a cylinder placed tandem with said cup and communicating with the atmosphere, and with said tube through a valved opening, a piston in said cylinder, and a connection between said piston and said plunger, of a tire-cover or casing.

6. In a wheel, the combination with the rim and the traction-member, of a series of pneumatically-connected outwardly-opening cups, plungers in said cups coacting with the traction-member, pump-cylinders between said cups and the rim separated from said cups by walls, pistons in said cylinders, rods connecting said plungers and said pistons and passing through said walls, and means whereby air may by said pistons be mingled with the air in said connected cups.

7. In a wheel, the combination with the wheel rim and the traction member, of interposed alternately-acting air-compression and air-pumping devices the said air-pumping devices being located next the rim and acting as dashpots for said compression devices and mingling fresh air with that acting on said compression devices.

Signed at New York city in the county of New York and State of New York this 27th day of July A. D. 1908.

ANSON R. BANGS.

Witnesses:
  ROBT. H. HIBBARD,
  R. W. BARKLEY.